A. S. MILINOWSKI.
CALCULATING MACHINE.
APPLICATION FILED AUG. 9, 1917.

1,385,700.

Patented July 26, 1921.

WITNESSES:
Walter B. Payne
Nelson H. Copp

INVENTOR
Arthur S. Milinowski
BY Church & Rich
his ATTORNEYS

A. S. MILINOWSKI.
CALCULATING MACHINE.
APPLICATION FILED AUG. 9, 1917.

1,385,700.

Patented July 26, 1921.
7 SHEETS—SHEET 2.

WITNESSES:

INVENTOR
Arthur S. Milinowski
BY
his ATTORNEYS

A. S. MILINOWSKI.
CALCULATING MACHINE.
APPLICATION FILED AUG. 9, 1917.

1,385,700.

Patented July 26, 1921.
7 SHEETS—SHEET 4.

WITNESSES:
Walter B. Payne
Nelson H. Copp

INVENTOR
Arthur S. Milinowski
BY
Church – Rich
his ATTORNEY

A. S. MILINOWSKI.
CALCULATING MACHINE.
APPLICATION FILED AUG. 9, 1917.

1,385,700.

Patented July 26, 1921.
7 SHEETS—SHEET 6.

INVENTOR
Arthur S. Milinowski
BY
his ATTORNEYS

WITNESSES:

A. S. MILINOWSKI.
CALCULATING MACHINE.
APPLICATION FILED AUG. 9, 1917.

1,385,700.

Patented July 26, 1921.
7 SHEETS—SHEET 7.

Witnesses
Walter Payne
Nelson H. Copp

INVENTOR
Arthur S. Milinowski
BY
his ATTORNEYS

UNITED STATES PATENT OFFICE.

ARTHUR S. MILINOWSKI, OF BROCKPORT, NEW YORK.

CALCULATING-MACHINE.

1,385,700.   Specification of Letters Patent.   Patented July 26, 1921.

Application filed August 9, 1917. Serial No. 185,356.

*To all whom it may concern:*

Be it known that I, ARTHUR S. MILINOWSKI, of Brockport, in the county of Monroe and State of New York, have invented certain new and useful Improvements in Calculating-Machines; and I do hereby declare the following to be a full, clear, and exact description of the same, reference being had to the accompanying drawings, forming a part of this specification, and to the reference-numerals marked thereon.

My invention has for its object to provide improvements in calculating machines, and has particular reference to the general type known as ten key machines, as distinguished from the more common eighty-one key or other multiple key machines having more than ten keys. More particularly the purpose of my invention is to afford a complete and unitary mechanism entirely controlled by ten keys, and making it possible to effect various calculations in succession and to register and also record, if desirable, the items as well as the results of such calculations. My invention has for its further object the provision of a simple and practicable mechanism which can be manufactured at a reasonable cost and will be accurate in its computation, also simple to operate. To these and other ends the invention consists in certain improvements and combinations of parts all as will be hereinafter more fully described, the novel features being pointed out in the claims at the end of the specification.

In the drawings.

Similar reference numerals in the several figures indicate the same parts.

The invention is shown as a ten key machine embodying a key controlling mechanism similar to that covered in my copending application, filed October 10, 1914, Serial No. 865,987. The mechanism disclosed in said application comprises generally a series of actuating devices which are arranged upon a traveling support and governed by a series of keys of which there are ten, acting selectively to move or permit movement of the actuating devices to any one of nine different numerical positions. At each operation of a key for setting an actuating device to a selected unit position, the traveling support is automatically advanced for successive denominational points. The same general method of setting the actuating devices is adopted in this case, and my present improvement consists more particularly in that the calculating and accumulating members are arranged upon a movably mounted frame that is operated, after the actuating devices are set, to move the accumulating or transfer members past the actuating devices in engagement therewith. The accumulating or transfer members are moved in accordance with and to the same extent as the corresponding actuating devices which are previously positioned, and the present structure is concerned with means for swinging the calculating mechanism past the actuating devices, the latter being held stationary after they are once positioned, until the calculation or addition of each item is completed, whereupon the actuating devices are returned to their normal position for the next operation. In order to give a complete understanding of the structure, I will describe briefly the key mechanism which forms no part of the present invention except in combination with the remaining structure and is embodied in substance in my pending application already mentioned.

1 designates the keys from zero to nine inclusive, extending through the top of the upper part 2 of the casing or housing which incloses the mechanism. The upper portion 2 of the housing is hinged upon the base portion 3 and held down by a pivoted catch 4, engaging a pin or stop 5 upon the base and is movable to permit the upper portion of the housing to be elevated to have access to the interior mechanism. The keys are connected so that when operated they serve to govern the locating or positioning of the actuating devices and for this purpose each key carries a plate 6 which is slotted at 7 to receive an extension 8 of an arm 9 which is fixed upon an oscillatory positioning stop 10, in the form of a rod. In the present structure, which is merely illustrative, there are nine such positioning stops, one for each key from zero to 8 inclusive, and by referring to Fig. 5, it will be observed that these stops are connected to and moved by the corresponding keys, while the "nine" key controls no stop, and when actuated, does not release any of the actuating devices but serves to advance the traveling support one step. This is explained by the fact that the actuating devices or segments, when in normal position, serve to move the accumulator or transfer members or wheels a maximum distance corresponding to nine units, and when the actuating devices are released and positioned at some point other than the normal one, they actuate the transfer wheels through a lesser distance. Thus the eight key when operated releases an actuating segment one step further and thus causes the corresponding transfer wheel to be moved one step less, the seven key permits an actuating segment to move two steps from its normal position, and thus operate the corresponding transfer wheel through a lesser distance by two units, and so on down to the zero key which permits an actuating segment to move to the maximum extent, where it is out of operative relation with the transfer wheels and thus causes no movement thereof, the zero key operation serving only to advance the traveling support which carries the actuating devices, and thereby change the denomination of the number. The "nine" key appears with its plate 6 in Fig. 5 in side elevation, and is not connected to any of the positioning stops and similarly also the zero key is unconnected to any positioning stop, although the latter is connected with the locking stop 11, which is operable automatically when any of the keys from zero to eight inclusive are depressed, to release an actuating segment. The zero stop is the uppermost one of the series, as indicated by 12, and stationary, as it represents the maximum possible movement of an actuating segment in the setting operation.

Figures 3, 7:
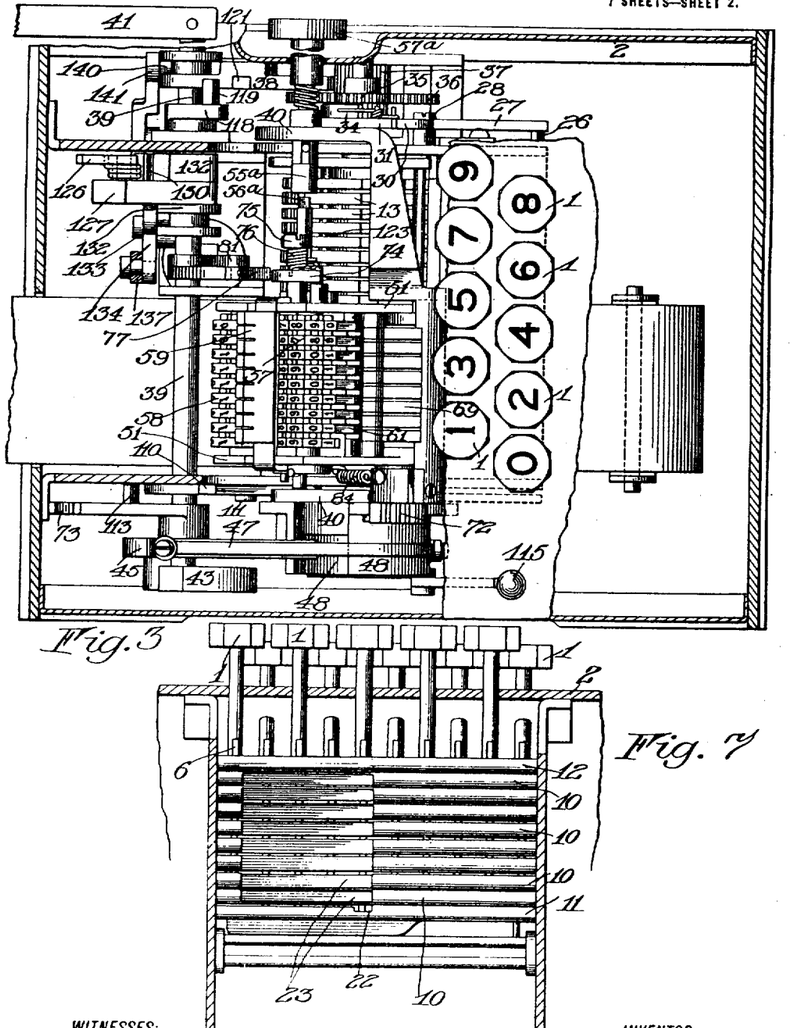
Fig. 3 is a horizontal section with the interior parts appearing in top plan view.
Fig. 7 is a longitudinal vertical sectional view on line $7^a$—$7^a$ of Fig. 4, and showing the key mechanism in rear elevation.
Figures 5, 6:
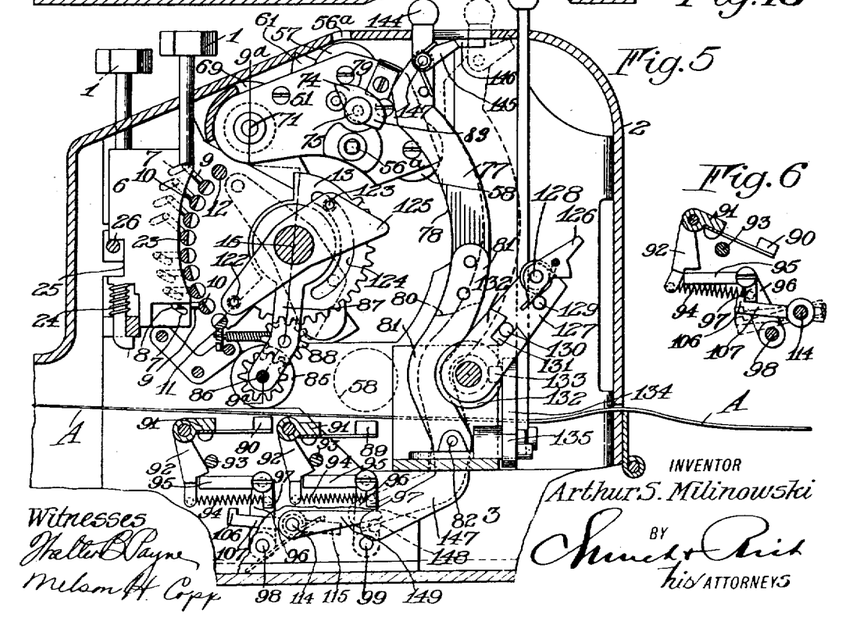
Fig. 5 is a vertical sectional view looking in the same direction as Fig. 4 in a different plane.
Fig. 6 is a detail view of the printing levers and their controlling mechanism.
Figure 8:
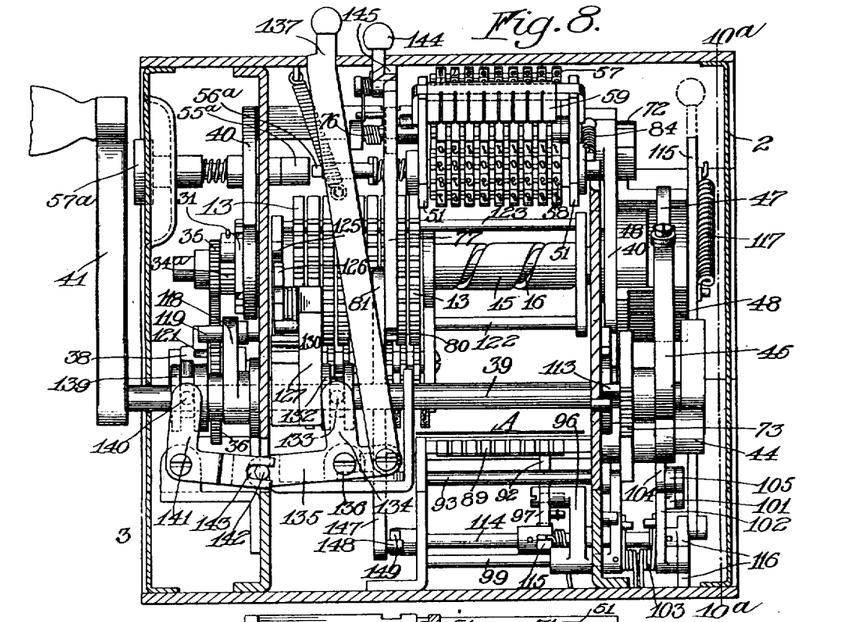
Fig. 8 is a longitudinal vertical sectional view on line $8^a$—$8^a$ of Fig. 4, showing the interior mechanism in rear elevation.
Figure 9:
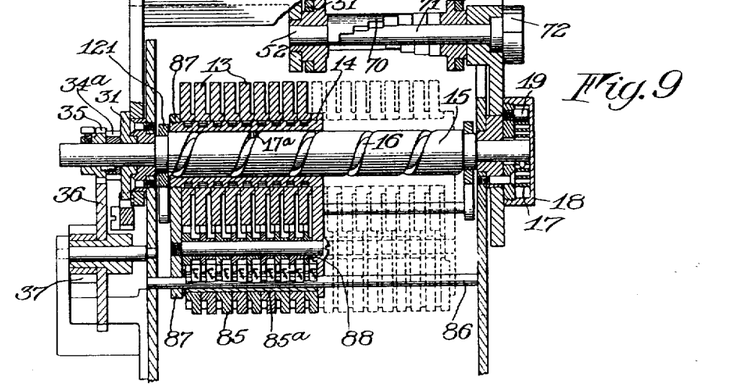
Fig. 9 is a vertical sectional view on the line $9^a$—$9^a$ of Fig. 5.
Figures 14, 16:
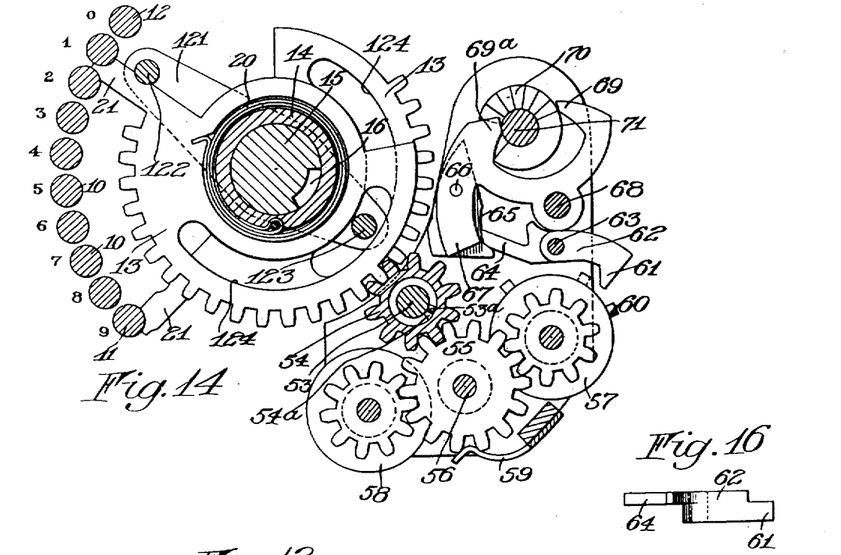
Fig. 14 is a similar view showing the position of the calculating mechanism as it is moved downwardly into coöperation with the actuating segments.
Fig. 16 is a detail view in elevation of one of the carrying levers of the calculating mechanism.

The actuating devices, which are preferably in the form of gear segments are designated by 13, see Figs. 5 and 8 and 9, there being nine of these in the present embodiment, making the machine operable up to nine denominations although this may be varied to change the limitations of the machine without departing in any sense from the principles involved. The actuating segments are journaled upon a traveling support 14 which is in the form of a sleeve mounted upon a spindle 15 for longitudinal movement and held thereon against rotation. The spindle 15 is provided with a spiral or cam slot 16 that receives a coöperating projection 17ª, whereby longitudinal movement is imparted to the sleeve, and to the actuating segments when the controlling keys are operated. The spindle 15 is actuated by a coil spring 17 arranged in a housing 18 and having one end attached to the spindle 15 and its opposite end secured to a stationary stop 19. The spring 17 is put under tension by winding at each operation of the machine, and actuates the spindle 15 for rotation at each key operation. The spindle 15 is normally locked against rotary movement, and is released by each key operation to permit the spring to operate, as will appear more fully from the following description. Each actuating segment 13 is movable in a clockwise direction, by a coil spring 20 which has one end attached to the segment 13 and the opposite end attached to the sleeve 14, Figs. 9 and 14 and lies in a recess in the traveling support or sleeve 14 providing play room for the spring, and each actuating segment is provided with a stop portion 21 which normally engages the locking stop 11 in the manner shown in Fig. 14. At each key operation, the locking stop 11 is partially rotated, whereby a cutaway portion 22, see Fig. 7, is brought opposite the stop portion 21 so that the latter is free to move beyond the locking stop 11, and travels upwardly under the impulse of the spring 20 until it engages the positioning stop 10, which has already been partially turned by the key operation, as illustrated in Fig. 14, where the stop portion 21 of one of the actuating segments 13 has traveled upwardly and is in engagement with the "one" key positioning stop. Each of the positioning stops 10 and the locking stop 11 are cut away, substantially diametrically, or in other words, slabbed off so as to have a flat side as at 23, see Fig. 7, to permit the stop portions 21 of the actuating segments during their upward movement to clear such of the positioning stops 10 as have not been turned by key actuation, and also to permit the stop portions 21 to be returned downwardly after an operation past the positioning stops 10 and also past the locking stop 11. The flat side of the latter, unlike that of the stops 10, is normally turned somewhat away from the stop portions 21 as shown in Fig. 5 so that the stop 11 holds the portions 21 below it until partially rotated by the keys through the lever connection shown to allow the portions 21 to escape one by one at the cut away portion 22. The latter, as shown in Fig. 7, is additional to the cut away portion 23 and is just wide enough to permit the escape of one of the portions 21 at a time. When the portions 21 are returned downwardly after an operation is completed, and strike one edge of the flat side 23 of stop 11, they turn the same to the position normally occupied by stops 10 so that the portions 21 can be moved below stop 11 which is then rotated by the spring shown so as to hold the portions 21 beneath it. When the key operation takes place, the corresponding positioning stop is turned sufficiently to remove the cutaway portion 23 from the path of movement of the stop portion of the segment so that the latter is engaged and held by the positioning stop until the traveling support has received its longitudinal movement, carrying the segment along with it until it is beyond the cutaway portion 23 and against the solid portion of the positioning stop where it is retained until the completion of the calculating operation.

Figures 4, 18:
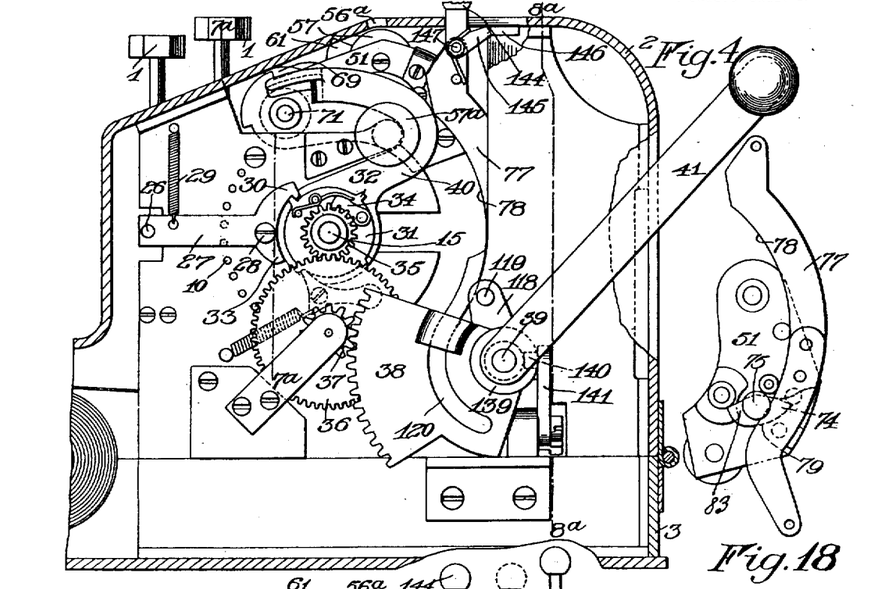
Fig. 4 is a vertical sectional view showing the interior mechanism in end elevation.
Fig. 18 is a detail view showing the position of the swinging frame immediately prior to its upward return movement.

I have pointed out that the positioning stops 10 are operatively connected to and moved by the keys 1 through arms 9 which are governed by key plates 6, the keys being returned to their normal positions by springs 24 which also serve to restore the positioning stops. The key plates 6 are cutaway at 25 to afford engagement with a universal bar 26, see Figs. 4 and 5, which is connected to an arm 27, pivoted at 28 and normally held up by a spring 29. The arm 27 carries an escapement pawl 30 which controls and permits movement of the spindle 15 by releasing it each time a key is depressed. To this end, the spindle 15 carries a disk 31, rotatable on the spindle at its outer end, but having a pawl and ratchet connection therewith as will presently appear, and provided with a series of teeth or projections 32 which the pawl 30 engages, as shown in Fig. 4, holding the spindle against movement, and when a key 1 is depressed, the bar 26 is also lowered, swinging the arm 27 downwardly and moving the pawl 30 so as to release the spindle 15 and permit the spring 17 to actuate it far enough to move the traveling support one step as the segment is positioned. The pawl 30 carries a tail piece 33 which engages the next following projection 32 just after the release of the spindle, as in the usual escapement mechanism. The disk 31 is rotatable upon the spindle 15 as already mentioned, and carries a spring controlled locking pawl 34 engaging a ratchet wheel 34$^a$ that is fixed upon the spindle, thus locking the spindle and disk for movement in one direction and permitting free movement of the spindle in the opposite direction, and by this means, the unwinding or setting operation of the spindle 15 is controlled by the escapement pawl 30, while the spindle 15 can be turned in the opposite direction or anticlockwise to restore the parts and rewind the spring 17 after the completion of an operation. For this purpose the spindle 15 has fixed thereon a pinion 35 engaging a gear 36 arranged on a stub shaft which carries fixed thereon a second pinion 37. The latter engages a segmental gear 38 which is loosely journaled upon a shaft 39, and operated in a manner that will appear hereinafter. The parts which I have thus far described are substantially like the construction of my former application previously mentioned, and effect the positioning of the actuating segments 13 at different points in their oscillatory movement determined by the initial key operations. The number of actuating segments which are thus positioned and the points to which they are adjusted, determines the extent of movement of transfer wheels of a coöperating calculating mechanism, which will now be described. There are different ways in which my purpose may be accomplished, but I prefer to employ actuating devices in the form of gear segments and move the transfer wheels past the same, the latter being rotated by engagement with the actuating gear segments. The extent of movement of the transfer wheels is thus determined by the number of teeth of the segments remaining in operative position. Preferably, the entire calculating mechanism is mounted upon a frame that swings about the rotary axis of the actuating segments, and I will now describe this portion of the structure in detail.

Figure 1:
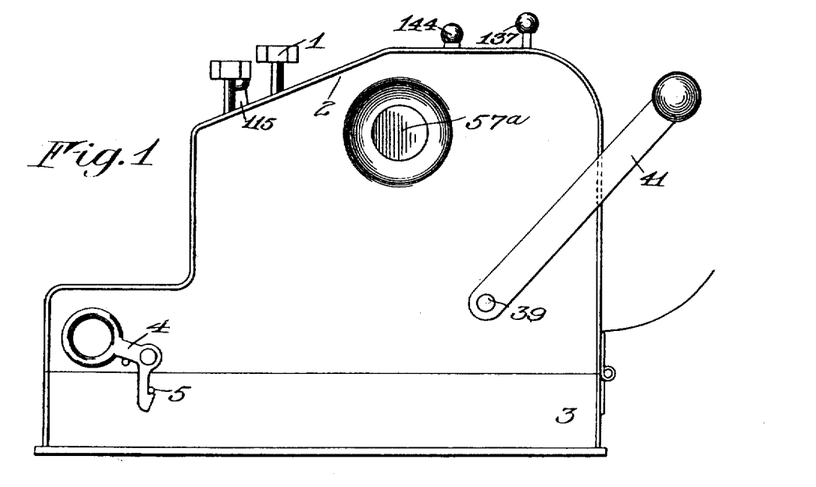
Figure 1 is a side elevation of a machine embodying a preferred form of the invention.
Figure 2:
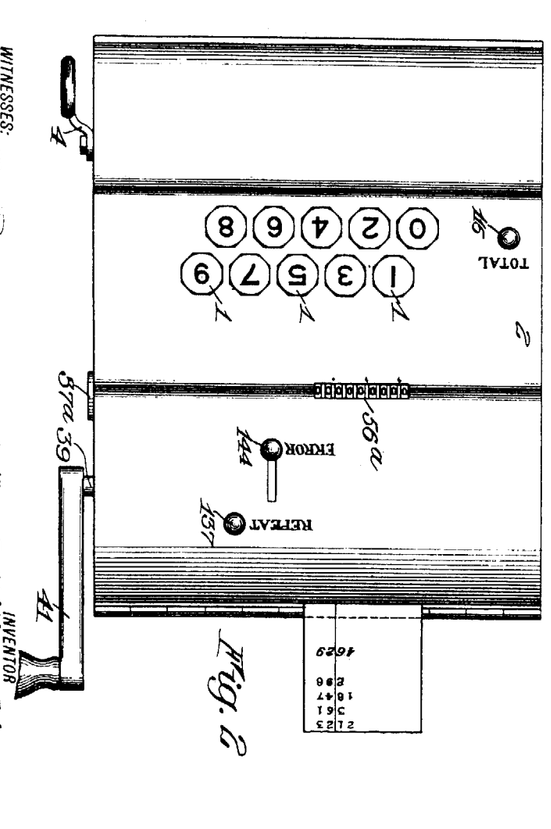
Fig. 2 is a plan view.
Figure 10:
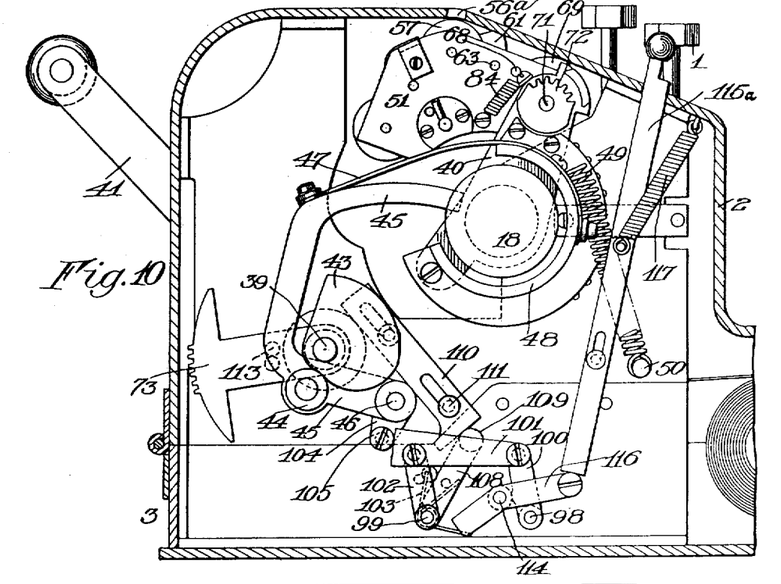
Fig. 10 is a vertical sectional view on the line $10^a$—$10^a$ of Fig. 8, illustrating the parts in normal position.
Figure 12:
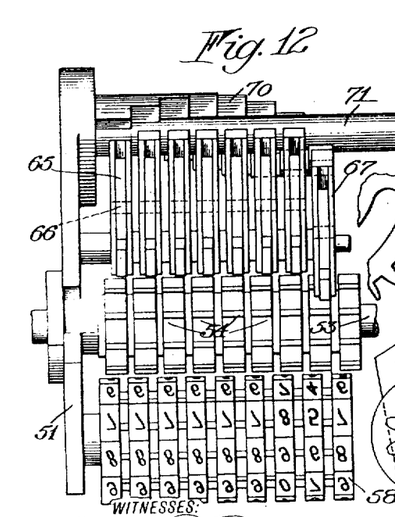
Fig. 12 is a view in elevation of the swinging calculating mechanism.
Figures 13, 17:
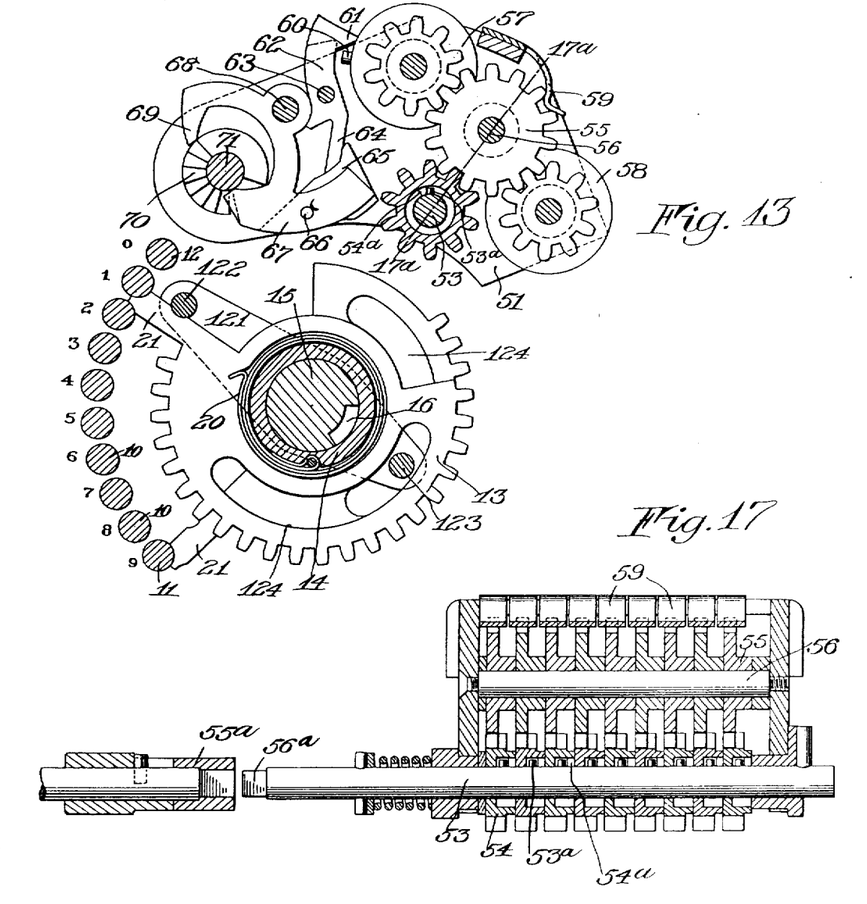
Fig. 13 is a side view, partly in section, showing the position of the calculating mechanism, and the actuating gear segments previous to an operation, one actuating segment having been set by a key to govern the movement of the calculating mechanism.
Fig. 17 is a sectional view on line $17^a$—$17^a$ of Fig. 13.

The calculating mechanism is mounted upon a frame comprising side plates or arms 40 which are journaled to swing about the spindle 15 from the position shown in Fig. 13 to that shown in Fig. 14. To effect this movement, there is provided a hand lever 41, fixed upon the shaft 39 which also carries a cam 43. The latter engages a projection or roller 44 upon a lever 45 which is pivoted to swing about the center 46 and is connected by a flat spring or other preferably flexible member 47 to a collar 48 carried by one of the arms 40 of the swinging frame. Thus when the hand lever 41, shown in Figs. 1 and 10, is moved in an anti-clockwise direction with reference to Fig. 1, or clockwise with reference to Fig. 10, it rotates the cam 43, actuating lever 45 to the position shown in Fig. 11, and thus through the flexible strap 47 rotates the frame and calculating mechanism about the spindle 15, the said frame being restored to its normal position, when the handle 41 is released, through the instrumentality of a spring 49 connected at one end to the collar 48 and at its opposite end to a stationary projection 50, see Fig. 10. Pivotally mounted upon the frame just described, is a supplemental frame or holder comprising side plates 51 that swing about an axis 52 in suitable bearings in the arms 40 already described. The supplemental holder carries a shaft 53 on which are journaled the transfer or accumulator wheels 54, which engage the actuating segments 13, and are moved thereby during the downward movement of the frame, as shown in Figs. 14 and 15. The transfer wheels 54 coöperate with pinions 55, journaled on a spindle 56 of the supplemental frame, and the latter in turn operate registering wheels 57, which are normally visible through an opening 56ᵃ in the casing, and also the total printing wheels 58. 59 are spring followers engaging the pinions 55 and acting to prevent excessive movement thereof beyond the normal step-by-step operation. In order to effect carrying over from one column to another automatically, I employ pins or projections 60 which are mounted upon the registering wheels 57 at such a point that when any particular registering wheel shall have rotated completely or through ten units, it will automatically act to move the wheel of the next higher denomination one step. To accomplish this, the projection 60 of each registering wheel coöperates with a nose 61 on a lever 62 pivoted at 63. The lever 62 has an offset tail-piece 64 which engages a dog 65, which when thrust forward by the action of tail piece 64, is arranged to engage the transfer wheel of the next higher denomination and move it an additional step, as later described. The dog 65 is pivoted at 66 between the side plates 67 of a cam lever which is pivoted on the bar 68 and carries dogs 69 and 69ᵃ governed by a stepped cam 70 on the rotatable cam shaft 71. The cam shaft 71 is rotated to effect the carrying operations at the limit of the downward movement of the frame through the instrumentality of a pinion segment 72 fixed upon the end of the shaft 71 and engaged by a toothed segment 73 that is fixedly mounted upon the shaft 39, as shown clearly in Figs. 11 and 12.

Figure 11:
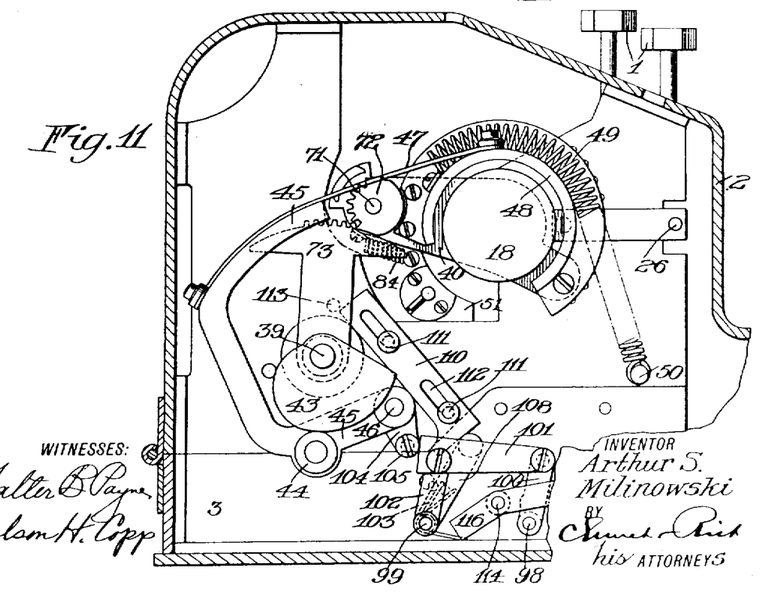
Fig. 11 is a vertical sectional view similar to Fig. 10, showing the parts at an intermediate position of the operation.
Figure 15:
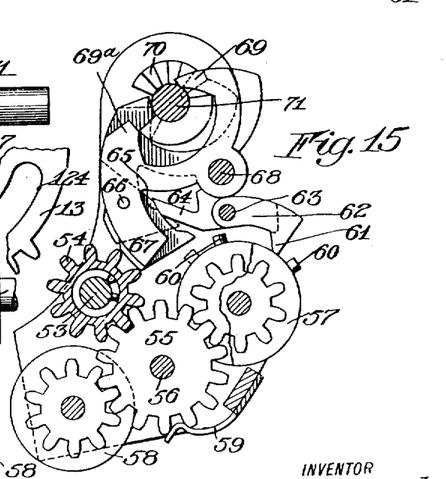
Fig. 15 is a view similar to Fig. 14, showing the position of the parts of the calculating mechanism after disengagement from the actuating segments.

During downward movement of the swinging frame, the supplemental frame or holder is moved inwardly toward the actuating segments and during the upward movement it is actuated outwardly, disengaging the transfer wheels, as indicated by a comparison of Figs. 14 and 15, and this is effected by the following mechanism which appears clearly in Fig. 5. The side plate 51 carries a pivoted pawl 74 which is mounted upon a pin 75 and governed by the spring 76. 77 is a cam bar normally in the position shown in Fig. 5, and provided with a curved inner edge 78 which engages the curved surface 79 of the pawl 74. When the frame reaches a point in its downward movement, the pawl 74 rides beyond the bar 77 which terminates at the dotted line 80, and is fixedly attached at one side of the post 81, the latter being pivoted at 82 for a purpose that will appear later. Upon the return or upward movement of the swinging frame, the nose of the pawl 74 engages the lower end of the cam bar 77 and is turned by it on its pivot against the tension of the spring 76, thereby bringing the opposite surface 83 of the pawl against the curved surface 78 and permitting the supplemental frame or holder to swing away from the gear segments under the action of the spring 84, shown in Fig. 10. As the swinging frame is moved downward by operating the hand lever 41, the transfer wheels 54 are turned by the gear segments 13 which have been previously positioned by operation of the keys, and the amount of movement of the transfer wheels 54 and of the calculating mechanism controlled thereby, depends upon the extent of the previous selective movement of the actuating segments. The parts are so related that the carrying instrumentalities are not operated until after the transfer wheels 54 are disengaged from the actuating segments 13. This is accomplished by reason of the fact that the toothed segment 73 engages pinion segment 72 immediately after the pawl 74 reaches the lower end of the cam rod 77, or in other words, just as the transfer wheels 54 are disengaged from the actuating segments 13, as shown in Fig. 15. When the toothed segment 73 engages the pinion 72, as shown in Fig. 11, the cam shaft 71 is rotated and the carrying operation completed in the manner already described. The shaft 53 is slidable longitudinally, to bring pins 53ª into line with the shoulders 54ª of the transfer wheels 54, for resetting the calculating mechanism wheels to zero position, and this is accomplished by a spring actuated manually operated key 55ª which engages the squared end 56ª of shaft 53, and is turned by a milled thumb wheel 57ª.

After the computation has been effected, or as illustrated in the present embodiment, after any particular item has been added to the previous total, it is desirable to record the item and also at times the total, as usually practised in this class of machines, and in order to accomplish this object, I employ independent sets of item printing wheels and total printing wheels, which will now be described. The item printing wheels are designated by 85, and are mounted upon a sleeve 85ᴬ, slidable along a bar 86 together with the traveling support upon which the actuating segments are mounted, see Fig. 9. The item printing wheels are journaled between extension plates 87 on the traveling support 14, one for each actuating segment 13, and are actuated by the segments 13 through pinions 88 which transmit the movement of any actuating segment directly to the corresponding item printing wheel during the key setting operation. The total printing wheels are designated at 58, as already referred to, and when the swinging frame reaches the limit of its downward movement, the total printing wheels and also the item printing wheels are in position to make an impression through an inked ribbon or carbon sheet upon a strip of paper which may be fed through the machine by any suitable instrumentalities, and is forced against the respective printing wheels to receive an impression by the following means.

Referring to Figs. 5 and 8, the record or paper strip A is immediately under the printing wheels and arranged beneath the record strip, are hammers 89 and 90, the first mentioned hammers coöperating with the total printing wheels, and those last mentioned coöperating with the item printing wheels. The hammers 89 and 90 are mounted upon frames 91, each of which is provided with an arm 92 normally resting against a stop 93 and held in such position by a spring 94. The arms 92 are actuated by push rods 95 which are pivotally mounted upon the levers 96 and provided with extensions 97 to which the springs 94 are connected at one end. The levers 96 are fixed upon rock shafts 98 and 99, see Figs. 5, 10 and 11, controlling the item and total printing respectively. The shaft 98 has fixed thereon also an arm 100 which is connected by a link 101 with an arm 102 that is loose upon the shaft 99 and actuated normally upwardly by a spring 103 which engages a stop on the arm. The lever 45 is provided with an extending portion 104 carrying a projection 105 which engages the end of the link 101, moving the latter and thereby rocking the shaft 98, which is turned to move over the push rod 95 and also the arm 92 which controls the item printing. This movement continues until the extension 97 is engaged by a nose 106 upon a lever 107, which rocks the push rod 95 downwardly, releasing the arm 92 and permitting the printing hammers to move upwardly under the impetus of the spring 94 and force the paper against the item printing wheels. To effect total printing, when desired, the rock shaft 99 carries fixed thereon an arm 108 having a projection 109 that is engaged by a slide 110, movable upon stationary pins 111 engaging the slots 112. The slide 110 is engaged and operated downwardly by a projection 113 on the segment 73, as shown in Fig. 11. This takes place at the last part of the stroke of the hand lever 41 before it is released, and causes the rock shaft 99 to be rotated, and correspondingly moving the arm 95 which controls the total printing. With the parts positioned as shown in Fig. 5, the total printing hammers will not be released and total printing will not take place, and when a total record is desired, a second operation of the hand lever 41 is effected, before or during which the lever 107 is rocked upon its axis 114, as will presently be described, bringing its opposite end 115 upwardly into the path of the extension 97 on shaft 99, whereupon the total printing hammers are released in the same manner as already described for the item printing hammers. The lever 107 is brought to and held in this position by depressing the spring actuated plunger 115ª, see Fig. 10, which engages an arm 116 that is fixed upon the shaft 114.

When the plunger 115ª is released, it is returned to its normal position by a spring 117. It will be understood that with the plunger 115ª in the normal position shown in Fig. 10, when the hand lever 41 is operated after the preliminary setting of the keys, the item is set up on the item printing wheels and the total is set up on the total printing wheels and registering wheels, as already described, after which and during the final movement of the hand lever, item printing is effected by releasing the item printing hammer but the total is not printed at this time. To effect printing of a total, the hand lever 41 is returned to its normal position and again operated while holding down the plunger 115ª, thus permitting the item printing hammers to remain inoperative and causing the total printing hammers to be released as already described and print the total. The paper supporting and feeding mechanism forms no part of my invention, and any convenient mechanism may be utilized for this purpose. In order that this part of the machine will be readily accessible, the upper part of the casing 2 can be lifted away from the base 3 after releasing the catch 4, see Fig. 1.

The spring 17 which through the spindle 15 holds the traveling support for the actuating segments under tension is wound in the following manner. I have already referred to the pinion 35 and gear 36, which are turned as the spring is unwound when the keys 1 are operated. The arbor on which the gear 36 is mounted carries fixed thereon the pinion 37 engaging the gear segment 38, which is thus moved about its pivotal axis upwardly as the keys are operated to set up any particular item. The shaft 39 has fixed thereon an arm 118 carrying a pin 119 which travels in a slot 120 of the segment 38. Thus when the hand lever 41 is moved forwardly or to the left of Figs. 1 and 4 for operating the calculating mechanism, the pin 119 travels downwardly until it engages the end of the slot 120 and thereafter moves the segment 38 in a downward direction and through the gears 35, 36 and 37 turns the spindle 15 in an anti-clockwise direction placing the spring 17 under tension for the next operation.

The gear segments 13 are returned about their axes to their normal positions through the instrumentality of a resetting member comprising a swinging frame including end plates 121 Fig. 14 and longitudinal bars 122 and 123, the latter engaging slots 124 in the actuating segments. The frame just referred to is freely movable about the spindle 15 and is provided at one end with a nose or projection 125, as shown in Fig. 5 by which such end of the frame is moved upwardly through the instrumentality of a spring latch 126 mounted on an arm 127 that is movable with the shaft 39 when the hand lever 41 is operated. It will be noted that the latch 126 is yieldable in one direction upon the pin 128, its movement in the opposite direction being limited by the projection 129, the purpose of which construction is to permit forward movement of the hand lever and of the latch 126 past the nose 125, and upon the return movement of the hand lever, to bring the latch 126 into positive engagement with the nose 125, causing upward movement of the rod 123 of the resetting frame and through the slots 124, moving the actuating segments back to their initial positions. It will be understood that the actuating segments and the traveling support upon which they are mounted are moved longitudinally to be restored to initial position by the reverse turning of the spindle 15, at the same time that the spring 17 is put under tension, as described previously.

In some instances it is desirable to repeat the same item one or more times, and to accomplish this, the arm 127 already referred to, which carries the latch 126 is arranged for longitudinal adjustment on the shaft 39, and moves therewith when in normal position by reason of a pin 130 which engages a recess 131 in a projection that is fixed upon the shaft 39. If it is desired to repeat an item, or in other words, add the same item twice, the arm 127 is moved longitudinally of shaft 39 far enough to bring the latch 126 into a plane to one side of the nose 125 on the resetting frame, thus preventing the return of the actuators 13 to their normal position and leaving them set up as for the item last entered. To this end, the arm 127 is connected to a collar 132, see Fig. 8, which latter is engaged by a pin 133 on an arm 134 of the lever 135. The latter is pivoted at 136 and operated by a plunger 137, which is normally held upwardly by a spring 138. During any such repeating operation, it is also necessary to disengage the rewinding mechanism for the spring 17, and to accomplish this the gear segment 38 is moved laterally a sufficient distance on the shaft 39 to disengage the pin 119 from the slot 120. To this end, said segment 38 is provided with a collar 139 which is engaged by a pin 140 on a bell crank lever 141 that is connected for operation to the aforementioned lever 135, see Fig. 8, by a pin 142 and slot 143 on the respective members. The effect of this mechanism is that when the plunger 137 is depressed the pawl 126 and also the segment 38 are both moved laterally with relation to the members with which they coöperate so that the segment 38 and resetting bar 123 are not moved as ordinarily when the hand lever 41 is operated, and the only effect of moving the latter under such circumstances is to repeat the operation of adding the same item one or more times. When the plunger 137 is released the parts are restored to their normal position for the usual operation.

In case of an error in the operation of any of the keys when it is desirable to restore the parts to their normal position without effecting a computing operation, the cam bar 77 is shifted to the position shown in dotted lines in Fig. 5. To accomplish this, the bar is provided with a pivoted finger piece 144, having a tail piece 145 normally engaging a stop 146, and by swinging the finger piece on its axis 147, it is released from the stop 146 and can then be moved rearwardly, as shown in dotted lines. Under this condition, when the calculating mechanism and its frame swing downwardly, the pawl 74 does not engage the cam bar 77 and therefore the transfer wheels 54 swing rearwardly away from the actuating segments 13 so that no computation is effected, while the actuating segments are restored to their normal positions as already described. In order to prevent the printing mechanism from operating when the error key is depressed, I provide an extension 147 on the post 81. The extension 147 carries a pin 148 arranged to engage an arm 149 fixed on the shaft 114. Thus, when the post 81 moves rearwardly, it turns the shaft 114, moving the levers 107 and 115 to neutral position, out of the path of the extensions 97, so that no operation of the printing devices takes place.

I claim as my invention:

1. In a calculating machine, the combination of a plurality of key controlled actuating devices, calculating devices, means for selectively placing any desired ones of said actuating devices and calculating devices into coöperative relation, and means for moving said calculating devices when in engagement with said actuating devices to cause them to perform calculations, the actuating devices remaining stationary during such calculations.

2. In a calculating machine, the combination of a series of actuating devices, means for setting said devices to represent a number, calculating devices, means for selectively placing desired ones of said actuating devices into coöperative relation with the calculating devices, and means for moving the calculating devices relatively to the actuating devices to transfer the number to the calculating devices, the actuating devices remaining in set position during the movement of the calculating devices.

3. In a calculating machine, the combination of key controlled actuating devices, movable into both numerical and denominational position, a movable frame, calculating devices mounted in said frame, and means for moving the frame to carry the calculating devices past the actuating devices to effect calculation.

4. In a calculating machine, the combination of a plurality of actuating devices, means for shifting said devices to predetermined selected denominational and numerical position, a movable frame, transfer members carried on the frame adapted to engage said actuating devices during movement of the frame, and item printing devices controlled by said actuating devices.

5. In a calculating machine, the combination with a plurality of key controlled actuating devices which are shiftable to any selected position, of a movable frame, calculating mechanism carried on the frame including transfer members which are engaged by the actuating devices during movement of the frame, item printing wheels controlled by the actuating devices, and total printing wheels controlled by said transfer members.

6. In a ten-key calculating machine, the combination of a traveling support, a plurality of key controlled actuating devices movably mounted thereon, a movable frame, transfer devices mounted thereon, means for moving the frame past the actuating devices to effect an operation of said transfer devices, and item printing type carriers on said traveling support and controlled by said actuating devices.

7. In a ten-key calculating machine, the combination of a traveling support, a plurality of key controlled actuating devices movably mounted thereon, a movable frame, transfer devices mounted thereon, means for moving the frame past the actuating devices to effect an operation of said transfer devices, item printing type carriers on said traveling support and controlled by said actuating devices, and total printing devices arranged in said frame and controlled by said transfer devices.

8. In a calculating machine, the combination of a plurality of actuating devices, a traveling support on which said actuating devices are mounted, means for numerically shifting said devices on said support, transfer members adapted to move into and out of engagement with said actuating devices, means for moving the transfer members past the actuating devices while the latter remain stationary to operate the transfer members, and total printing wheels controlled by said transfer members.

9. In a calculating machine, the combination of a traveling support, a plurality of key controlled actuating devices mounted on said support, item printing devices also mounted on said support and controlled by said actuating devices, transfer devices also controlled by the actuating devices, total printing devices controlled by the transfer members, and total indicating devices operated by said transfer devices.

10. In a calculating machine, the combination of a plurality of gear segments movable in one direction to correspond with the digits of a number to be set up thereon and in a second direction to correspond with the denominations of said digits, a plurality of keys for controlling the movements of said segments, means effecting said segment movements under control of said keys, a movable frame, transfer gears carried in said frame, and means for moving said frame to bring said transfer gears into engagement with said gear segments for operation by the latter.

11. In a calculating machine, the combination of a plurality of key controlled gear segments, means for moving said segments to a predetermined selected position, a movable frame, transfer gears carried in said frame, total printing devices controlled by said gears, and means for moving said frame whereby the transfer gears are engaged and operated by the gear segments.

12. In a calculating machine, the combination with a plurality of key controlled actuating devices, of a traveling support on which the actuating devices are shiftable, an oscillatory frame, calculating mechanism carried on the frame including transfer gears arranged on a holder which is movable on the frame, and means coöperating with said holder and acting to retain the gears in engagement with the actuating devices during movement of the frame in one direction and to disengage the gears from the actuating devices during movement of the frame in the opposite direction.

13. In a calculating machine, the combination with a plurality of key controlled gear segments which are oscillatory to any selected position, of a traveling support on which the segments are mounted, a frame which is oscillatory about the rotary axis of said gear segments, calculating mechanism carried on the frame including transfer gears which are engaged and operated by said segments, item printing wheels mounted on the traveling support and controlled by the actuating segments, and total printing wheels arranged on said frame and operated by the transfer wheels.

14. In a calculating machine, the combination with a plurality of key controlled actuating devices, a traveling support on which the actuating devices are shiftable, and a controlling spring for each of the actuating devices having one end connected to the support and the opposite end connected to the actuating device and housed between the actuating device and the support.

15. In a calculating machine, the combination of a traveling support, a plurality of gear segments rotatably mounted thereon, key controlled devices for rotating said segments to selected positions to represent a number, transfer gears adapted to oscillate about the axis of the gear segments, means for moving said transfer gears into engagement with said gear segments, means for maintaining said engagement during oscillation of the transfer gears in one direction, and means for disengaging the transfer gears from the gear segments during the return movement thereof.

16. In a calculating machine, the combination of a series of actuating devices movable to selected positions to represent a number, calculating devices comprising transfer members and carrying mechanism, a movable frame in which the calculating devices are mounted, means for moving said frame relatively to the actuating devices to effect a transfer of said number to the calculating devices, operating means for the carrying mechanism normally out of coöperative relation therewith, means for bringing said operating means and carrying mechanism into coöperative relation and for actuating said operating means to effect the operation of the carrying mechanism.

17. In a calculating machine, the combination of a series of actuating devices movable to selected positions to represent a number, a frame movable relatively to said actuating devices, calculating mechanism mounted on the frame including transfer members and type carriers, means for moving said frame to effect a transfer of said number to the calculating mechanism, and clearing devices for returning said calculating mechanism to zero position.

18. In a calculating machine, the combination of a series of actuating devices shiftable to selected positions to represent a number, a frame movable relatively to said actuating devices, calculating devices comprising transfer wheels and adding wheels mounted on said frame, clearing devices for returning said adding wheels to zero position, means for moving said frame to effect a transfer of said number to said calculating devices, and a key for controlling the operation of the clearing mechanism, and means attached to the key for withdrawing it from coöperative relation with the clearing mechanism when the adding wheels are in zero position.

19. In a calculating machine, the combination of a plurality of key controlled actuating devices positionable to represent a number, a traveling support on which the actuating devices are mounted, calculating mechanism mounted in a frame which is movable relatively to the actuating devices to effect introduction of said number into the calculating mechanism, item printing type carriers mounted on the traveling support and controlled by the actuating devices, and total printing type carriers mounted on the frame and controlled by the calculating mechanism.

20. In a calculating machine, the combination of a plurality of key controlled actuating devices positionable to represent a number, a traveling support on which the actuating devices are mounted, calculating mechanism mounted in a frame which is movable relatively to the actuating devices to effect introduction of said number into the calculating mechanism, item printing type carriers mounted on the traveling support and controlled by the actuating devices, and total indicators mounted on the frame and controlled by the calculating mechanism.

21. In a calculating machine, the combination of a traveling support, a plurality of key controlled actuating devices carried thereby, coöperating bearing surfaces on said support and devices providing for shifting movement of the latter in opposite directions, and a controlling spring connected to each of said devices and to said support, said bearing surfaces on one of said parts having recesses therein to receive and confine said springs.

22. In a calculating machine, the combination with a series of actuating devices movable into any selected numerical position, of a locking portion carried on each actuating device, a universal locking stop normally holding the actuating device against movement, and means for releasing the actuating device to permit movement, the locking portion of any actuating device operating to move the locking stop out of the path of all the locking portions during the return of said actuating device to normal position.

23. In a calculating machine, the combination of an actuating device positionable to represent a number, a series of calculating units mounted on a movable frame, means for bringing the actuating device and any desired one of the calculating units selectively into coöperative relation, and means for moving the frame to cause said calculating device to be actuated to the extent corresponding to said movement.

24. In a calculating machine, the combination of an actuating device positionable to represent a number, a movable frame, calculating mechanism including carrying mechanism mounted on said frame, means for moving the frame past the actuating device to effect transfer of said number to the calculating mechanism, and means for actuating said carrying mechanism while the frame is stationary.

25. In a calculating machine, the combination of an actuating device positionable to represent a number, a movable frame, calculating mechanism including carrying mechanism mounted on said frame, means for moving the frame past the actuating device to effect transfer of said number to the calculating mechanism, operating means for the carrying mechanism normally out of coöperative relation therewith, means for bringing the carrying mechanism and said operating means into coöperative relation, and means for moving the operating means to actuate the carrying mechanism.

ARTHUR S. MILINOWSKI.